(12) United States Patent
Salter et al.

(10) Patent No.: US 9,982,780 B2
(45) Date of Patent: May 29, 2018

(54) ILLUMINATED INDICATOR

(71) Applicant: Ford Global Technologies, LLC, Dearborn, MI (US)

(72) Inventors: Stuart C. Salter, White Lake, MI (US); Todd Jared Konet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/363,298

(22) Filed: Nov. 29, 2016

(65) Prior Publication Data
US 2017/0072846 A1   Mar. 16, 2017

Related U.S. Application Data

(60) Division of application No. 14/796,430, filed on Jul. 10, 2015, now Pat. No. 9,539,940, which is a continuation-in-part of application No. 14/603,636, filed on Jan. 23, 2015, now Pat. No. 9,573,517, which is a continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *F16H 63/42* | (2006.01) |
| *H05B 37/02* | (2006.01) |
| *B60Q 3/68* | (2017.01) |
| *B60Q 3/283* | (2017.01) |
| *B60Q 3/80* | (2017.01) |
| *B60K 20/02* | (2006.01) |
| *B60K 20/08* | (2006.01) |

(52) U.S. Cl.
CPC ............. *F16H 63/42* (2013.01); *B60Q 3/283* (2017.02); *B60Q 3/68* (2017.02); *B60Q 3/80* (2017.02); *H05B 37/0218* (2013.01); *H05B 37/0227* (2013.01); *B60K 20/02* (2013.01); *B60K 20/08* (2013.01); *F16H 2063/423* (2013.01); *Y02B 20/46* (2013.01)

(58) Field of Classification Search
CPC ........ B60K 20/00; B60K 20/02; B60K 20/06; B60K 20/08; B60Q 3/008; B60Q 3/02; B60Q 3/0209; B60Q 3/024; H05B 37/0218; H05B 37/0227
USPC .......................................... 362/487–488, 491
See application file for complete search history.

(56) References Cited

U.S. PATENT DOCUMENTS

| | | |
|---|---|---|
| 2,486,859 A | 11/1949 | Meijer et al. |
| 3,896,759 A | 7/1975 | Ogura |
| 4,964,359 A | 10/1990 | Richmond |
| 5,053,930 A | 10/1991 | Benavides |
| 5,434,013 A | 7/1995 | Fernandez |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A gear shifter indicator assembly is provided herein. The gear shifter assembly includes a light source disposed below a plurality of indicia. A position indicator is configured to move in concert with a shifter lever. The light source is disposed on the position indicator. A first photoluminescent structure is proximate the indicia and is configured to luminesce in response to excitation by the light source.

19 Claims, 12 Drawing Sheets

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 5,997,161 A | 12/1999 | Stringfellow et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,499,582 B1 | 12/2002 | Kino et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264079 A1 | 9/2014 | Tarahomi et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102006026869 A1 | 12/2007 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

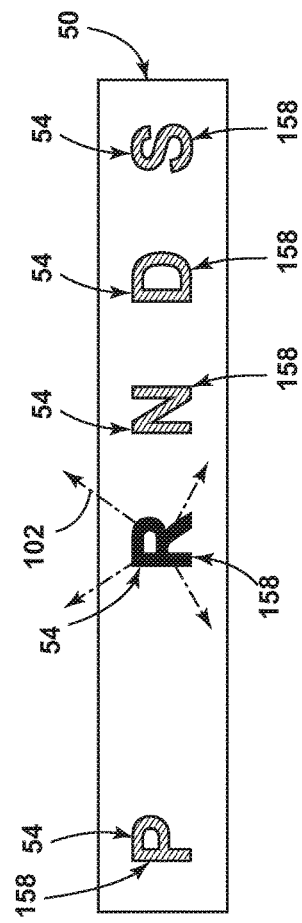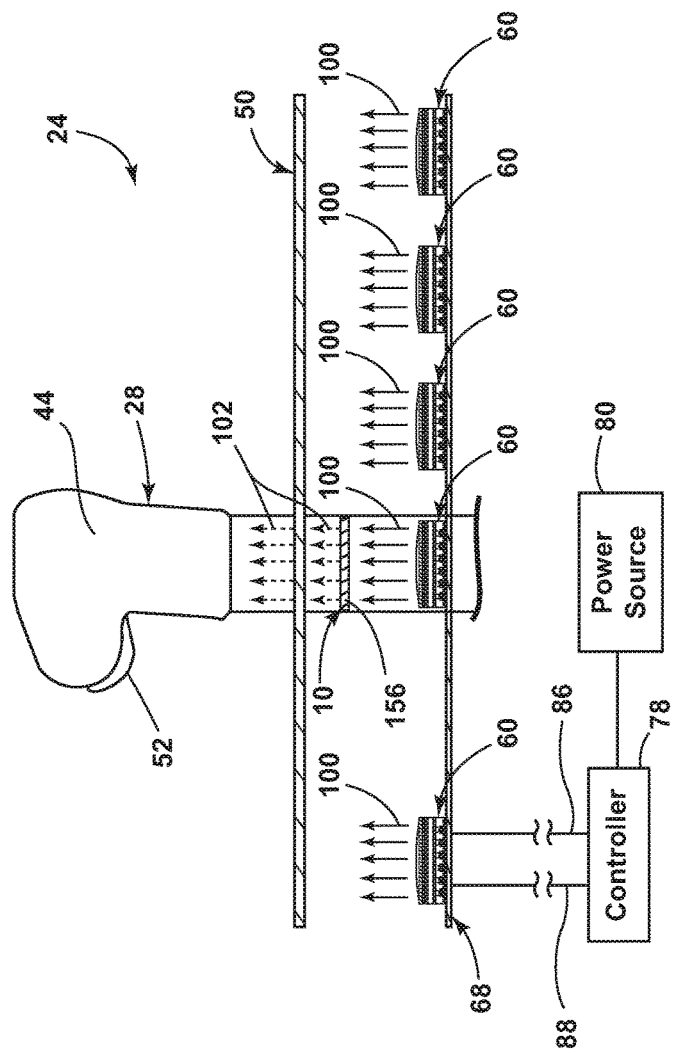
FIG. 6A
FIG. 6B

ILLUMINATED INDICATOR

CROSS-REFERENCE TO RELATED APPLICATIONS

This application is a divisional of U.S. patent application Ser. No. 14/796,430, filed Jul. 10, 2015, entitled "ILLUMINATED INDICATOR," which is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a gear shifter indicator assembly is disclosed. The gear shifter indicator assembly includes a light source disposed below a plurality of indicia. A position indicator is configured to move in concert with a shifter lever. The light source is disposed on the position indicator. A first photoluminescent structure is proximate to the indicia and is configured to luminesce in response to excitation by the light source.

According to another aspect of the present invention, a gear shifter indicator assembly for a vehicle is disclosed. The gear shifter assembly includes a member having a plurality of indicia thereon. A light source is configured to move in concert with a gear shifter lever. The light source cooperates with the indicia to notify an occupant of a transmission mode. A luminescent structure is configured to luminesce in response to excitation by the light source.

According to yet another aspect of the present invention, a gear shifter indicator assembly is disclosed. The gear shifter indicator assembly includes a member having one or more transmissive member portions therein. A position indicator and one or more light sources are each configured to move in concert with a gear shifter lever. A first photoluminescent structure is disposed on the one or more transmissive member portions. The photoluminescent structure is configured to luminesce in response to excitation by the light source.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6A is a top view of a member illustrating the lighting system and indicia thereon for notifying an occupant of the current mode of a vehicle transmission, according to one embodiment;

FIG. 6B is a cross-sectional view taken along line VI-VI of FIG. 2 illustrating the lighting system with the gear shifter lever attached to a position indicator having a photoluminescent structure thereon;

DETAILED DESCRIPTION OF THE PREFERRED EMBODIMENTS

Figure 2:
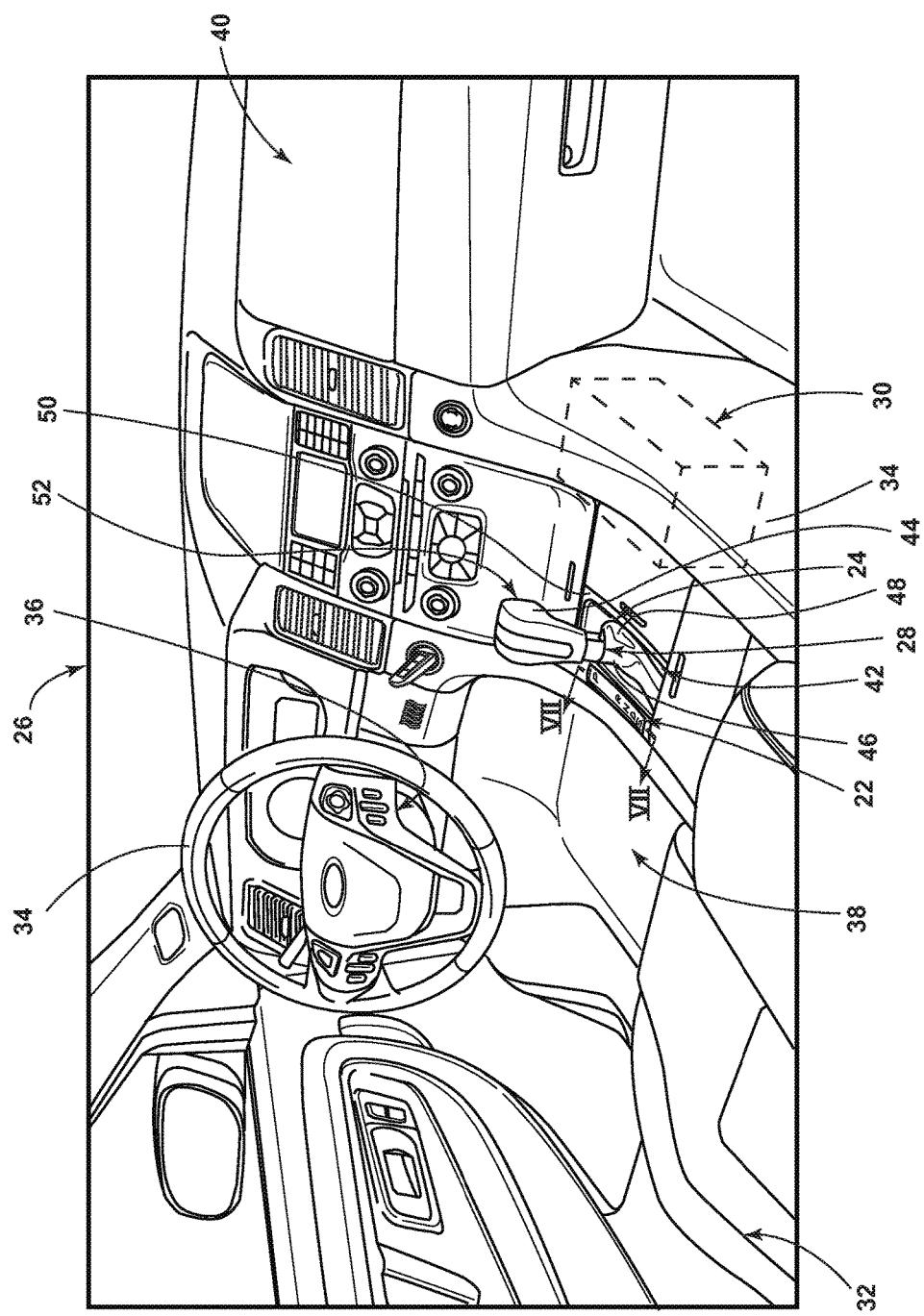
FIG. 2 is a perspective view of a vehicle interior equipped with a lighting assembly employed in the gear shifter indicator assembly according to one embodiment.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a gear shifter indicator assembly for a vehicle implementing a luminescent lighting system. The indicator assembly may advantageously employ one or more photoluminescent structures to illuminate in response to pre-defined events. The one or more photoluminescent structures may be configured to convert light received from an associated light source and re-emit the light at a different wavelength typically found in the visible spectrum.

Figure 1A:
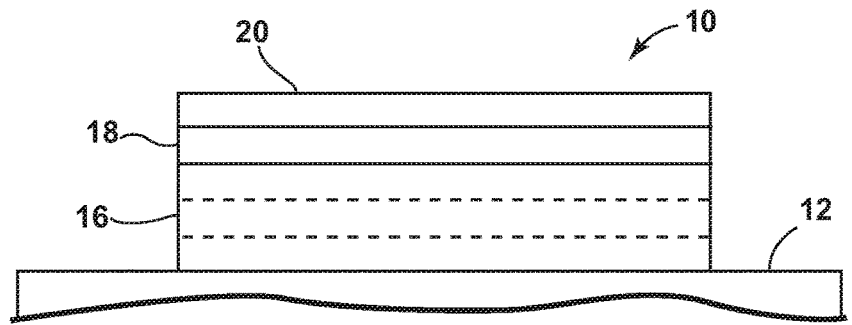
FIG. 1A is a side view of a photoluminescent structure rendered as a coating for use in a gear shifter indicator assembly according to one embodiment.
Figure 1B:
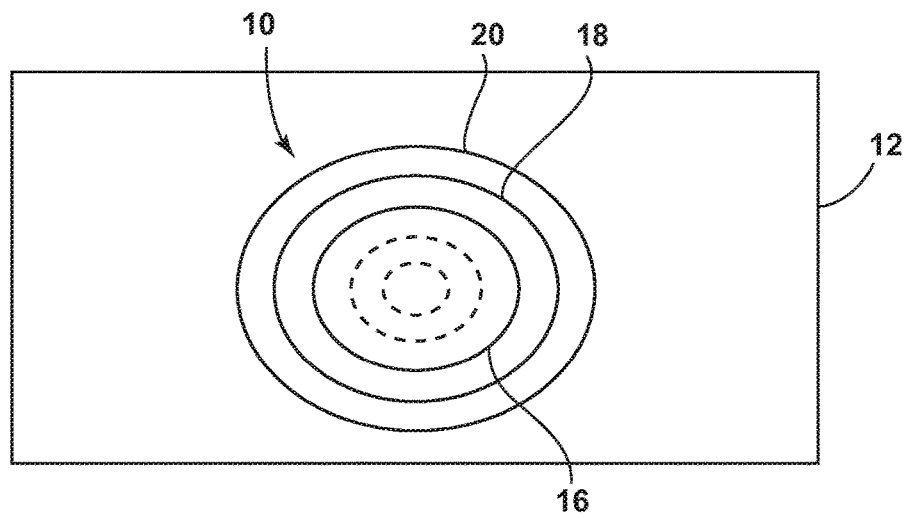
FIG. 1B is a top view of a photoluminescent structure rendered as a discrete particle according to one embodiment.
Figure 1C:
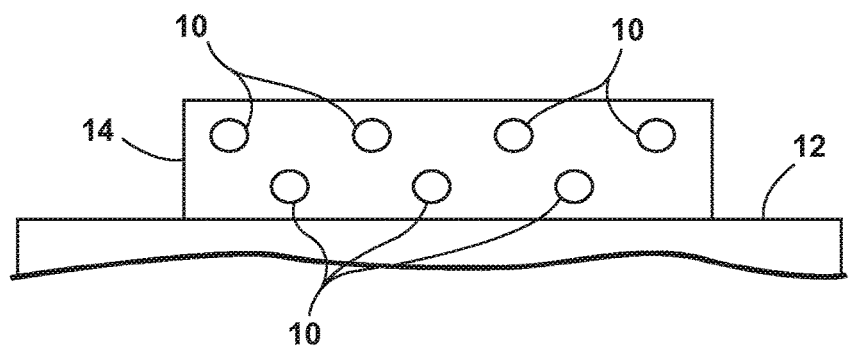
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials 96 (FIG. 4B) having energy converting elements with phosphorescent or fluorescent properties. Each photoluminescent material 96 may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) 96 found in the energy conversion layer 16. The process of using converted light 102 outputted from one photoluminescent material 96 to excite another, and so on, is generally known as an energy cascade and may serve as an alternative for achieving various color expressions. With respect to either conversion principle, the difference in wavelength between the exciting light and the converted light 102 is known as the Stokes shift and serves as the principle driving mechanism for an energy conversion process corresponding to a change in wavelength of light. In the various implementations discussed herein, each of the photoluminescent structures 10 may operate under either conversion principle.

The energy conversion layer 16 may be prepared by dispersing the photoluminescent material 96 in a polymer matrix to form a homogenous mixture using a variety of methods. Such methods may include preparing the energy conversion layer 16 from a formulation in a liquid carrier medium 14 and coating the energy conversion layer 16 to a desired substrate 12. The energy conversion layer 16 may be applied to a substrate 12 by painting, screen printing, spraying, slot coating, dip coating, roller coating, and bar coating. Alternatively, the energy conversion layer 16 may be prepared by methods that do not use a liquid carrier medium 14. For example, the energy conversion layer 16 may be rendered by dispersing the photoluminescent material 96 into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material 96 contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protective layer 20 optically coupled and adhered to the stability layer 18 or other layer (e.g., the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAG- NETIC ENERGY CONVERSION AND SUSTAINED SECONDARY EMISSION," filed Nov. 8, 2011, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Referring now to FIG. 2, a lighting system 22 is disposed within a gear shifter indicator assembly 24 of a vehicle 26 that is configured to illuminate an area proximate a shifter lever 28 to notify an occupant of the vehicle 26 of the current state of a vehicle transmission 30. The vehicle 26 shown in FIG. 1 includes a seating assembly 32, a steering wheel 34, and the gear shifter indicator assembly 24. It should be appreciated however that additional components might be used with those described herein. Additionally, the gear shifter indicator assembly 24 described herein may be utilized for any vehicle 26 such as, but not limited to, coupes, sedans, trucks, sport utility, vans, and the like. Further, it should be appreciated that any lighting system found elsewhere on the vehicle 26 might also be manufactured in accordance with the principles of the present disclosure.

The gear shifter indicator assembly 24 may be mounted to a floor console 68, according to one embodiment. In alternate embodiments, however, the gear shifter indicator assembly 24 may be mounted in any other desired location within the vehicle 26, including but not limited to, the steering column 36, the vehicle floor pan 38, and/or any portion of the instrument panel 40. The gear shifter indicator assembly 24 may include a shifter lever 28 to enable a vehicle driver to change the transmission 30 mode of operation. A finish panel 42 may be disposed around a portion of the shifter lever 28 through which the shifter lever 28 extends. In the illustrated embodiment, gear shifter indicator assembly 24 is for an automatic transmission 30; however, the same principles disclosed herein may be applied to any vehicle 26 having any type of transmission 30.

A shift knob 44 may be disposed at one end portion of the shifter lever 28. Additionally, a housing 46 may be attached to the shifter lever 28. In the shown embodiment, the housing 46 is a boot 48 composed of a fluid resistant material. The housing 46 is attached to the console 68 through a member 50, which may also function as a trim component of the vehicle 26, positioned between the housing 46 and the console 68.

The shifter lever 28 is movable to enable occupant selection of a gear from a set of various gears of the transmission 30, for example gear "P" (park gear), gear "R" (reverse gear), gear "N" (neutral gear), gear "D" (drive gear), "S" (manual shifting), and optionally other gears sequentially after gear "S" (not shown for simplicity). A button 52 may be disposed on or proximate to the shift knob 44 that is pressed by the driver to shift out of gear "P" (park gear) contemporaneously with the occupant also placing his/her foot on the brake, wherein the release from/to "P" is affected either mechanically or electronically.

Figure 3:
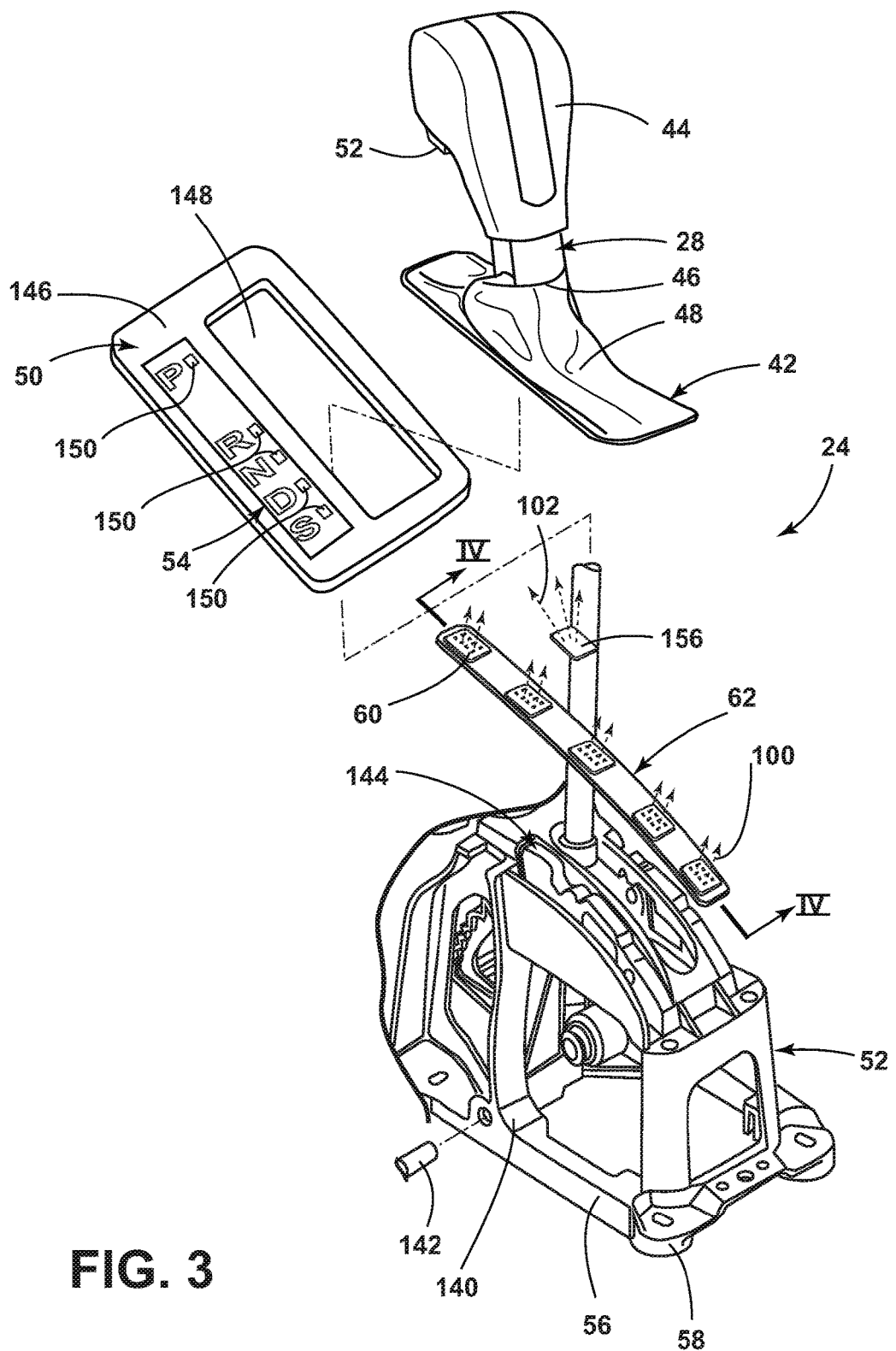
FIG. 3 is an exploded perspective view of the gear shifter indicator assembly employing the lighting system according to one embodiment.

Referring to FIG. 3, an exploded view of a portion of the components incorporated into the gear shifter indicator assembly 24, according to one embodiment, is illustrated. The member 50 may have indicia 54 corresponding to the gear positions thereon. The shifter lever 28 may be operably supported on the base for movement between the gear positions. More specifically, the base may include a bottom section 56 having attachment flanges 58 for attachment to a vehicle floor pan 38 or other support structure on the vehicle 26. Pivot mounts 140 for pivotally supporting the shifter lever 28 may extend upwardly from the sides of the bottom section 56 and are shaped to mateably receive a pivot pin 142. As illustrated, an arch 144 extends upwardly from the bottom section 56 and may include notches for defining the gear positions.

The member 50 may include a stationary top portion 146 with attachment flanges 58 configured to securely snap attach or screw attach to the base. A slot 148 is formed in the member 50 for receiving the shifter lever 28. The slot 148 extends along the indicia 54 and permits the shifter lever 28 to move between the gear positions. The indicia 54 can be any of a variety of different configurations. The illustrated indicia 54 includes indicator letters "P," "R," "N," "D," and "S." As illustrated, the indicia 54 is adjacent to light transmissive member portions 150. In alternate embodiments, the indicia 54 may be disposed on and/or formed from the light transmissive member portions 150. According to one embodiment, the member 50 and indicia 54 may be made of a single, or a plurality of, polymeric material that is formed into the appropriate shape through multiple-shot injection molding. However, it should be appreciated that the member 50 and indicia 54 may be made of any practicable material known in the art. Additionally, it should also be understood that any known manufacturing process might be utilized to form any part described herein.

The shifter lever 28 extends upwardly through the slot 148 in the member 50 and supports a shifter lever handle for grasping by the vehicle occupant. A button 52 may be disposed on the handle for engaging and disengaging the shifter lever 28 from the plurality of transmission 30 modes.

At least one light source 62 is disposed below the member 50 and proximate the indicia 54. In the presently illustrated embodiment, the light source 62 is configured as a light-producing assembly 60 that is arranged as a strip and may be powered using a vehicle power source (not shown) or other power source. The light source 62 and/or light-producing assembly 60 may include any form of light source 62, for example fluorescent lighting, light emitting diodes (LEDs), organic LEDs (OLEDs), polymer LEDs (PLEDs), solid state lighting, and/or any other form of lighting device. The light-producing assembly 60 may also include optics configured to disperse or focus light being emitted therefrom. According to one embodiment, the light-producing assembly 60 may include a flexible circuit board (e.g., a copper flexible circuit) that is coupled to an inner portion of the shifter assembly. In such an arrangement, the flexible circuit board may flex in conjunction with the inner portion to allow the light source 62 to be contoured to match the geometry of the shift assembly utilized. Furthermore, additional light-producing assemblies 60 may be coupled to other underside portions of the member 50 and/or indicia 54.

A position indicator 156 may be attached to the shifter lever 28 through any means known in the art. Alternatively, the position indicator 156 may be integrally formed with a portion of the shifter lever 28. The position indicator 156 may be adapted to highlight selected and limited portions of the indicia 54 to indicate the selected gear position of the shifter lever 28. The position indicator 156 may be transparent, translucent, or opaque and may include a photoluminescent structure 10, incorporating at least one a photoluminescent material 96 therein.

In operation, the photoluminescent structure 10 is configured to luminesce in response to excitation by light emitted by the light-producing assembly 60. More specifically, light emitted from the light-producing assembly 60 undergoes an energy conversion process where the emitted light is converted by the photoluminescent material 96 and is re-emitted therefrom at a different wavelength. The re-emitted light is subsequently directed towards the indicia 54 thereby backlighting the indicia 54. Light emitted by the light-producing assembly 60 is referred to herein as inputted light 100 and is demonstrated in FIGS. 4B-4E by solid arrows, whereas light re-emitted from the photoluminescent material 96 is referred to herein as converted light 102 and is demonstrated in FIGS. 4B-4E by broken arrows. According to one embodiment, the photoluminescent material 96 may be formulated to convert inputted light 100 into a longer wavelength light, otherwise known as down conversion. Alternatively, the photoluminescent material 96 may be formulated to convert inputted light 100 into a shorter wavelength light, otherwise known as up conversion. Under either approach, light converted by the photoluminescent material 96 may be subsequently outputted from the photoluminescent structure 10 or otherwise used in an energy cascade, wherein the converted light 102 serves as inputted light 100 to excite another formulation of photoluminescent material 96 located within the energy conversion layer 16, whereby the subsequent converted light 102 may then be outputted from the photoluminescent structure 10 or used as inputted light 100, and so on. With respect to the energy conversion processes described herein, the difference in wavelength between the inputted light 100 and the converted light 102 is known as the Stokes shift and serves as the principle driving mechanism for an energy conversion process corresponding to a change in wavelength of light.

According to one embodiment, the photoluminescent material 96 is formulated to have a Stokes shift resulting in the converted light 102 having an emission spectrum expressed in a desired color, which may vary depending on the lighting application. For example, the energy conversion process may be undertaken by way of down conversion, whereby the inputted light 100 includes light on the lower end of the visibility spectrum such as blue, violet, or ultraviolet (UV) light. Doing so enables blue, violet, or UV LEDs to be used as the LEDs, which may offer a relative cost advantage over other colors of LEDs or simply using LEDs of the desired color and omitting the photoluminescent structure 10 altogether.

Figure 4A:
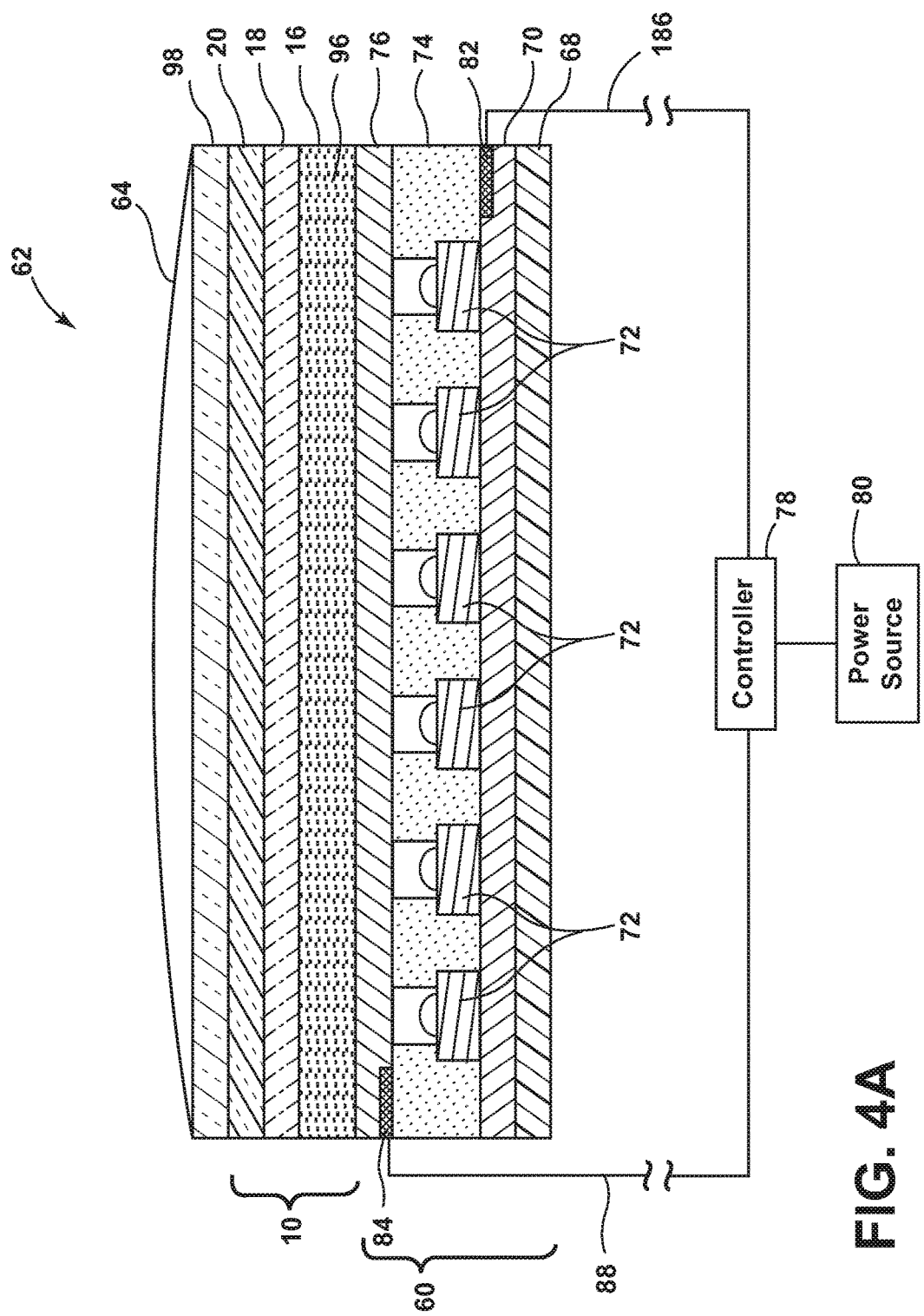
FIG. 4A is a cross-sectional view taken along line IV-IV of FIG. 3 illustrating a light source according to one embodiment.

Referring to FIGS. 4A-4E, a cross-sectional view of the light source 62 capable of use on a vehicle 26 with an external photoluminescent structure 10 is shown according to one embodiment. As illustrated in FIG. 4A, the light source 62 may have a stacked arrangement that includes a light-producing assembly 60, a photoluminescent structure 10, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 12 as its lowermost layer. The substrate 12 may include a polycarbonate, poly-methyl methacrylate (PMMA), or polyethylene terephthalate (PET) material on the order of 0.005 to 0.060 inches thick and is arranged over the intended vehicle surface on which the light source 62 is to be received (e.g., indicia 54). Alternatively, as a cost saving measure, the substrate 12 may directly correspond to a preexisting vehicle 26 structure (e.g., portion of shifter assembly, portion of member 50, etc.).

The light-producing assembly 60 includes a positive electrode 70 arranged over the substrate 12. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit light 100 towards a desired location.

The LED sources 72 may be dispersed in a random or controlled fashion within the semiconductor ink 74 and may be configured to emit focused or non-focused light toward the photoluminescent structure 10. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring still to FIG. 4A, the photoluminescent structure 10 described above is arranged over the negative electrode 76 as a coating, layer, film or other suitable deposition. With respect to the presently illustrated embodiment, the photoluminescent structure 10 may be arranged as a multi-layered structure including an energy conversion layer 16, optional stability layer 18, and optional protective layer 20.

The viewable portion 64 is arranged over the photoluminescent structure 10. In some embodiments, the viewable portion 64 may include a plastic, silicon, or urethane material and is molded over the photoluminescent structure 10 and light-producing assembly 60. Preferably, the viewable portion 64 should be at least partially light transmissible. In this manner, the viewable portion 64 will be illuminated by the photoluminescent structure 10 whenever an energy conversion process is underway. Additionally, by over-sealing the viewable portion 64, it may also function to protect the photoluminescent structure 10 and the light-producing assembly 60. The viewable portion 64 may be arranged in a planar shape and/or an arcuate shape to enhance its viewing potential. Like the photoluminescent structure 10 and the light-producing assembly 60, the viewable portion 64 may also benefit from a thin design, thereby helping to fit the light source 62 into small package spaces of the vehicle 26.

In some embodiments, a decorative layer 98 may be disposed between the viewable portion 64 and the photoluminescent structure 10. The decorative layer 98 may include a polymeric material or other suitable material and is configured to control or modify an appearance of the viewable portion 64 of the light source 62. For example, the decorative layer 98 may be configured to confer an appearance of a trim component on the vehicle 26 to the viewable portion 64 when the viewable portion 64 is in an unilluminated state. In other embodiments, the decorative layer 98 may be tinted any color to complement the vehicle 26 photoluminescent structure 10 on which the light source 62 is to be received. In any event, the decorative layer 98 should be at least partially light transmissible such that the photoluminescent structure 10 is not prevented from illuminating the viewable portion 64 whenever an energy conversion process is underway.

The overmold material 66 is disposed around the light-producing assembly 60 and/or photoluminescent structure 10. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the contact with additional components of the gear shifter indicator assembly 24 when the shifter lever 28 is moved from a first position to a second position. It is also contemplated that the viewable portion may be formed by a portion of the overmold material 66.

In some embodiments, the photoluminescent structure 10 may be employed separate and away from the light-producing assembly 60. For example, the photoluminescent structure 10 may be positioned on the indicia 54, the position indicator 156, and/or any surface proximate (e.g., components near the gear shifter indicator assembly 24), but not in physical contact with the light-producing assembly 60. It should be understood that in embodiments where the photoluminescent structure 10 is incorporated into distinct components separated from the light source 62, the light source 62 may still have the same or similar structure to the light source 62 described in reference to FIG. 4A.

Figure 4B:
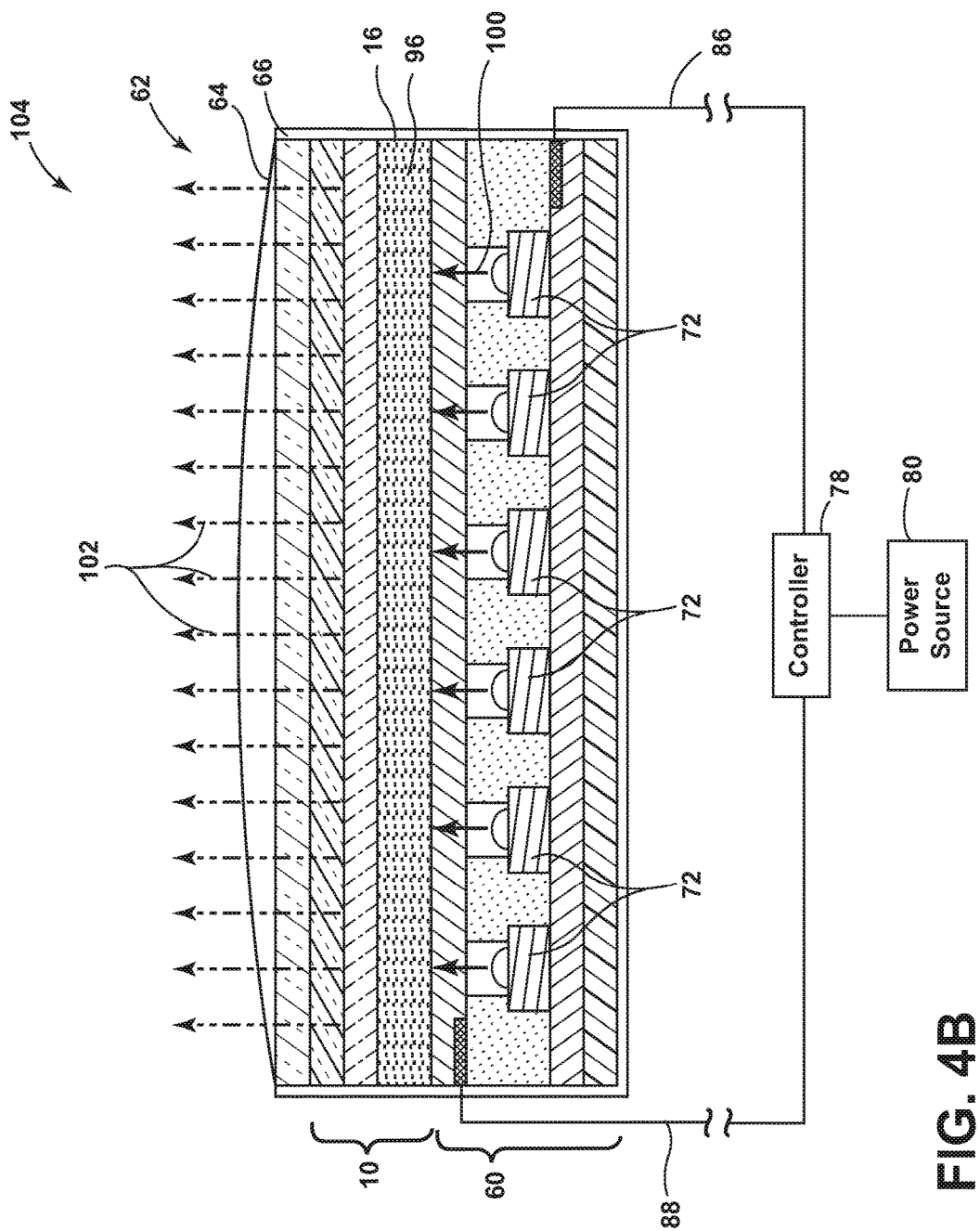
FIG. 4B is a cross-sectional view taken along line IV-IV of FIG. 3 further illustrating an the light source, according to one embodiment.

Referring to FIG. 4B, an energy conversion process 104 for producing single color luminescence is illustrated according to one embodiment. For purposes of illustration, the energy conversion process 104 is described below using the light source 62 depicted in FIG. 4A. In this embodiment, the energy conversion layer 16 of the photoluminescent structure 10 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the light source 62 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Figure 4C:
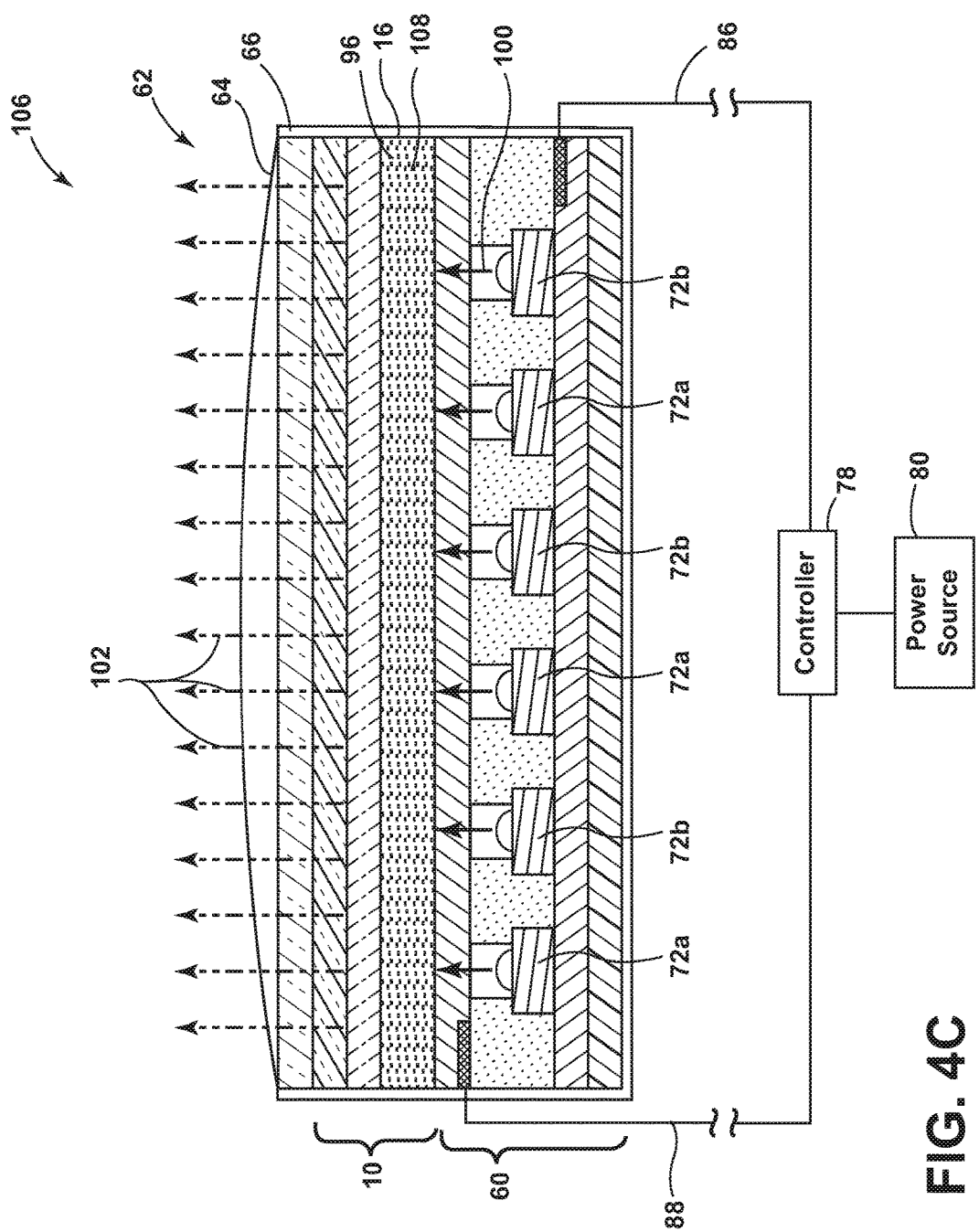
FIG. 4C is a cross-sectional view taken along line IV-IV of FIG. 3 illustrating an alternate light source, according to one embodiment.

Referring to FIG. 4C, a second energy conversion process 106 for generating multiple colors of light is illustrated according to one embodiment. For consistency, the second energy conversion process 106 is also described below using the light source 62 depicted in FIG. 4A. In this embodiment, the energy conversion layer 16 includes the first and second photoluminescent materials 96, 108 that are interspersed within the energy conversion layer 16. Alternatively, the photoluminescent materials 96, 108 may be isolated from each other if desired. Also, it should be appreciated that the energy conversion layer 16 may include more than two different photoluminescent materials 96 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72, exemplarily shown as LED sources 72*a*, is configured to emit an inputted light 100 having an emission wavelength that only excites photoluminescent material 96 and results in the inputted light 100 being converted into a visible light 102 of a first color (e.g., white). Likewise, a second portion of the LED sources 72, exemplarily shown as LED sources 72*b*, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72*a* and 72*b* may be selectively activated using the controller 78 to cause the photoluminescent structure 10 to luminesce in a variety of colors. For example, the controller 78 may activate only LED sources 72*a* to exclusively excite photoluminescent material 96, resulting in the viewable portion 64 illuminating in the first color. Alternatively, the controller 78 may activate only LED sources 72*b* to exclusively excite the second photoluminescent material 108, resulting in the viewable portion 64 illuminating in the second color.

Alternatively still, the controller 78 may activate LED sources 72*a* and 72*b* in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 62 may also be proportionally varied to one another such that additional colors may be obtained. For energy conversion layers 16 containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating the corresponding LED sources 72.

Figure 4D:
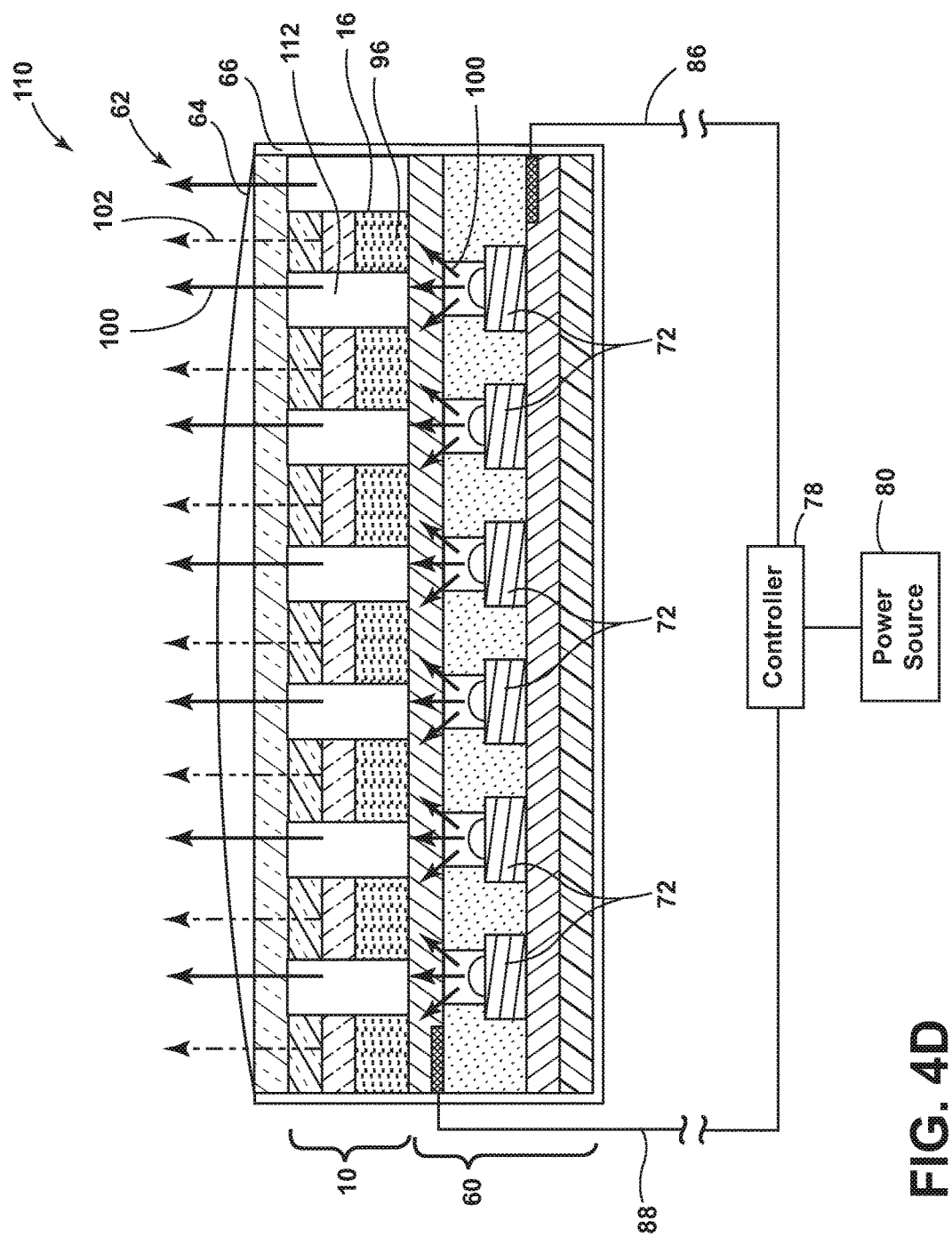
FIG. 4D is a cross-sectional view taken along line IV-IV of FIG. 3 illustrating a light source having a luminescent structure separated by light transmissive portions disposed on the light source, according to one embodiment.

Referring to FIG. 4D, a third energy conversion process 110 includes a light-producing assembly 60, such as the one described in reference to FIG. 4A, and a photoluminescent structure 10 disposed thereon is illustrated, according to an alternate embodiment. The photoluminescent structure 10 is configured to convert inputted light 100 received from LED sources 72 into a visible light 102 having a wavelength different than that associated with the inputted light 100. More specifically, the photoluminescent structure 10 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 10 may be applied to only a portion of the light-producing assembly 60, for example, in a stripped manner. Between the photoluminescent structures 10 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 10 disposed proximate to the light-producing assembly 60. The second photoluminescent structure 10 may be configured to luminesce in response to the inputted light 100 that is directed through the light transmissive portions 112.

Figure 4E:
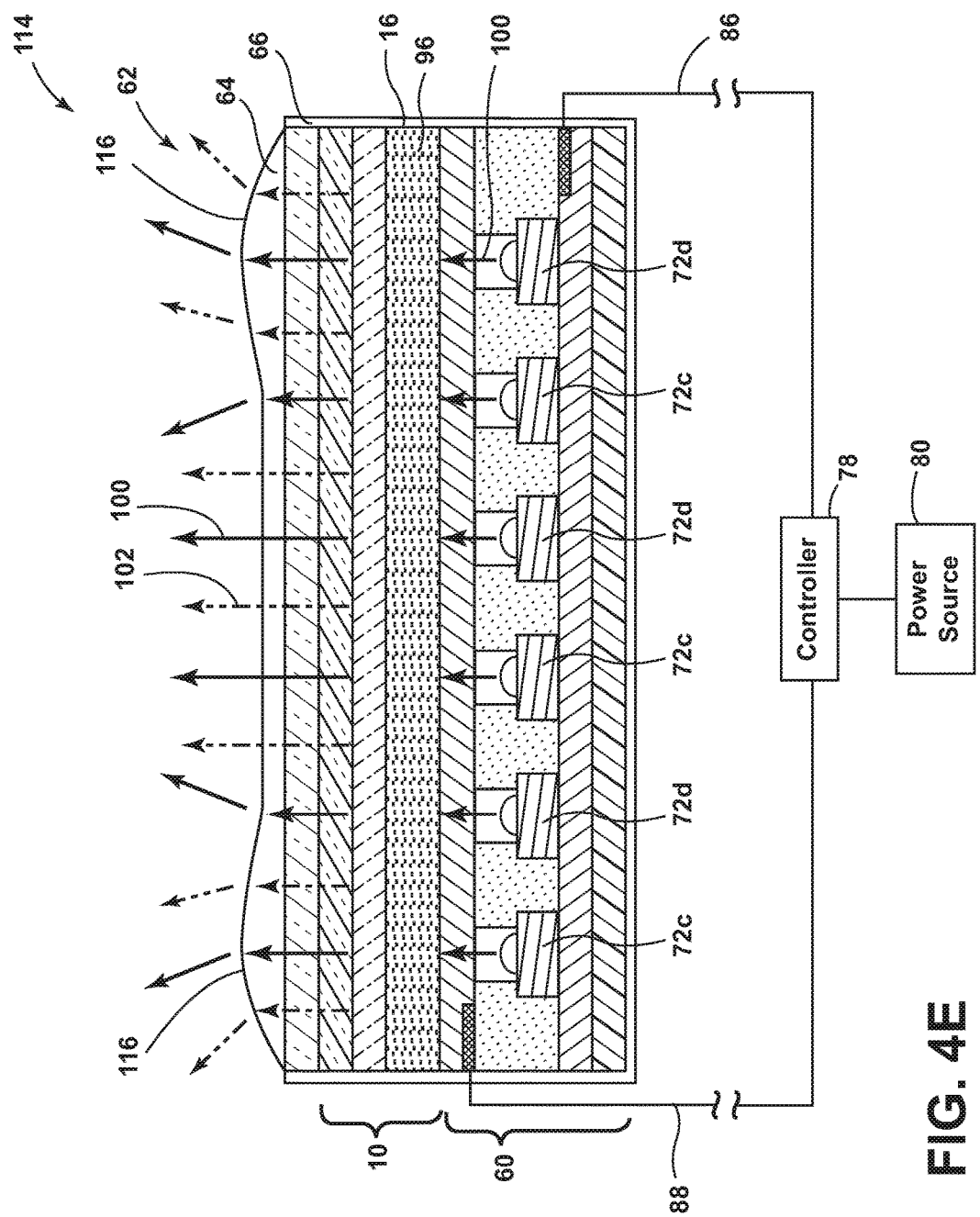
FIG. 4E is a cross-sectional view taken along line IV-IV of FIG. 3 illustrating an alternate light source having a luminescent structure disposed on the light source configured to convert a portion of light emitted from the light source from a first wavelength to a second wavelength, according to one embodiment.

Referring to FIG. 4E, a fourth energy conversion process 114 for generating multiple colors of light utilizing the light-producing assembly 60, such as the one described in reference to FIG. 4A, and a photoluminescent structure 10 disposed thereon is illustrated. In this embodiment, the photoluminescent structure 10 is disposed over a top portion 146 of the light-producing assembly 60. The excitation of photoluminescent material 96 is formulated such that a portion of inputted light 100 emitted from the LED sources 72 passes through the photoluminescent structure 10 at the first wavelength (i.e., the inputted light 100 emitted from the light source 62 is not converted by the photoluminescent structure 10). The intensity of the emitted light 100 may be modified by pulse-width modulation or current control to vary the amount of inputted light 100 emitted from the LED sources 72 that passes through the photoluminescent structure 10 without converting to a second, outputted 102 wavelength. For example, if the light source 62 is configured to emit light 100 at a low level, substantially all of the light 100 may be converted to the second wavelength 102. In this configuration, a color of light 102 corresponding to the photoluminescent structure 10 may be emitted from the light-producing assembly 60. If the light source 62 is configured to emit inputted light 100 at a high level, only a portion of the first wavelength may be converted by the photoluminescent structure 10. In this configuration, a first portion of the emitted light 100 may be converted by the photoluminescent structure 10 and a second portion of the light 100 may be emitted from the light-producing assembly 60 at the first wavelength towards additional photoluminescent structures 158 disposed proximately to the light source 62. The additional photoluminescent structures 158 may luminesce in response to the light 100 emitted from the light source 62.

According to one exemplary embodiment, a first portion of the LED sources 72, exemplarily shown as LED sources 72*a* is configured to emit an inputted light 100 having a wavelength that excites the photoluminescent material 96 within the photoluminescent structure 10 and results in the inputted light 100 being converted into a visible light 102 of a first color (e.g., white). Likewise, a second portion of the LED sources 72, exemplarily shown as LED sources 72*c*, is configured to emit an inputted light 100 having a wavelength that passes through the photoluminescent structure 10 and excites additional photoluminescent structures 158 disposed proximately to the lighting system 22 thereby illuminating in a second color. The first and second colors may be visually distinguishable from one another. In this manner, LED sources 72*a* and 72*c* may be selectively activated using the controller 78 to cause the lighting system 22 to luminesce in a variety of colors.

The light-producing assembly 60 may also include optics 116 that are configured to direct light 100 emitted from the LED sources 72*a*, 72*c* and the light 102 emitted from the photoluminescent structure 10 towards pre-defined locations. For example, light 100 emitted from the LED sources 72*a*, 72*c* and the photoluminescent structure 10 may be directed and/or focused towards a desired feature and/or location proximate to the light source 62.

Figure 5:
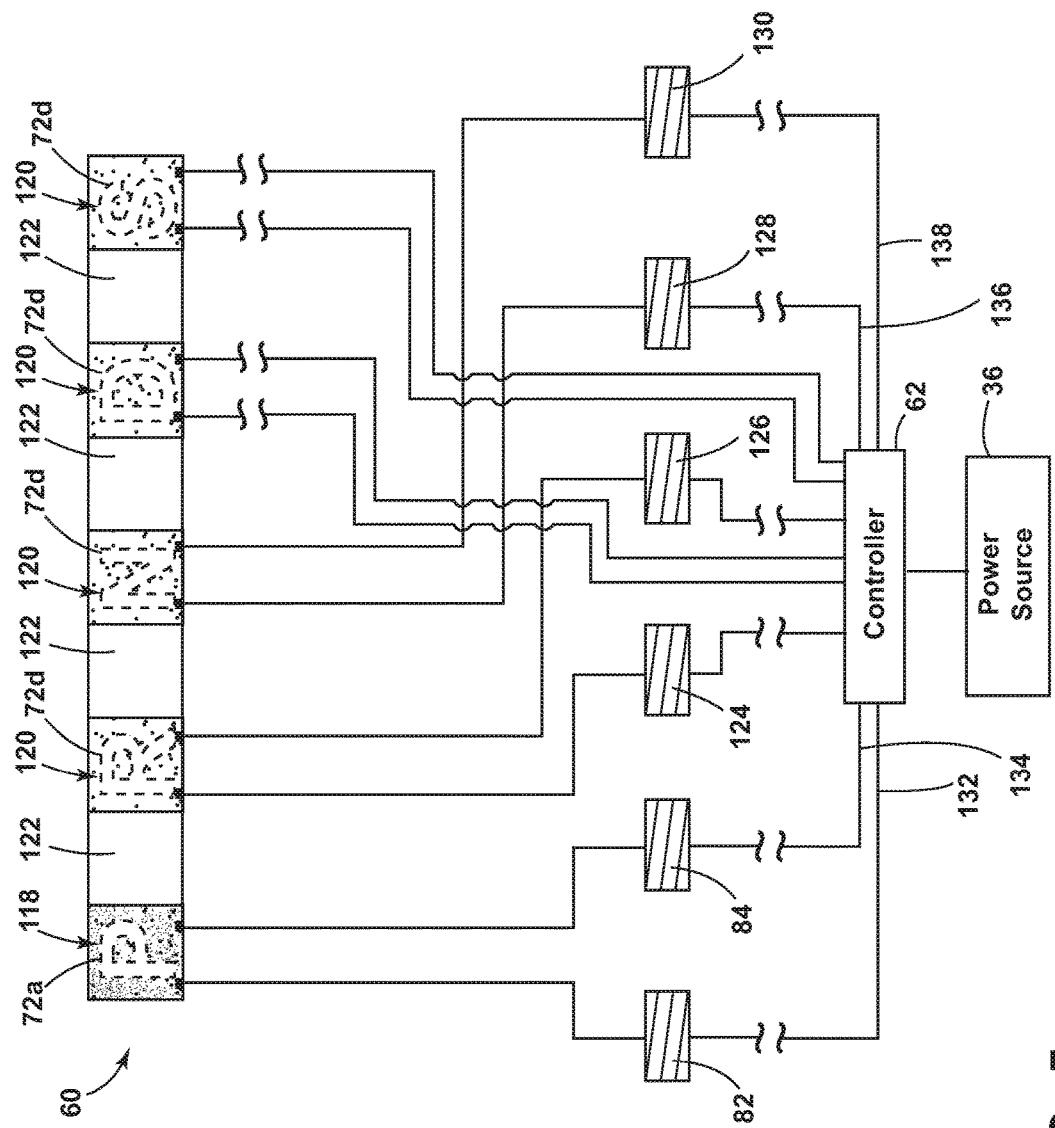
FIG. 5 illustrates a top view of a light-producing assembly, according to one embodiment, having varying types and concentrations of LED sources transversely along the light-producing assembly.

Referring to FIG. 5, a light-producing assembly 60, according to one embodiment, is illustrated from a top view having varying types and concentrations of LED sources 72*a*, 72*d* transversely along the light-producing assembly 60. As illustrated, a first portion 118 of the light-producing assembly 60 includes LED sources 72a that are configured to emit an inputted light 100 having an emission wavelength in a first color (e.g., red) spectrum. Likewise, a second portion 120 of the light-producing assembly 60 includes LED sources 72d that are configured to emit an inputted light 100 having an emission wavelength in a second color (e.g., orange) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. The insulative barriers 122 may also prevent a substantial amount of emitted light 100 from proximately illuminated light sources 72a, 72d from crossing through the insulative barrier 122. Further, each portion 118, 120 disposed within the light-producing assembly 60 may include a respective bus bar 82, 84, 124, 126, 128, 130, 132, 134, 136, 138 coupled to the controller 78 and configured to illuminate each respective portion 118, 120.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

As described above, a photoluminescent structure 10 may be disposed on a portion of the light-producing assembly 60. If desired, any of the LED sources 72a, 72d may be utilized for exciting any photoluminescent material 96 disposed proximately to and/or above the light-producing assembly 60.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light-producing assembly 60. For example, a first portion 118 of the light-producing assembly 60 may have a greater density of LED sources 72 than alternate portions 120, or vice versa. In such embodiments, the light source 62 and/or the indicia 54 may appear brighter or have a greater luminance in order to preferentially illuminate pre-defined locations. In other embodiments, the density of LED sources 72a, 72d may increase or decrease with increasing distance from a preselected point.

According to one embodiment, the light-producing assembly 60 includes a higher concentration of LED sources 72a proximate the indicia 54 having the "P" marking thereby indicating that the vehicle 26 is in park, with lower concentrations thereafter for the additional modes of the transmission 30. Alternatively, or additionally, a plurality of portions 188 may have a higher concentration to notify the occupant of a selected mode of operation.

Referring to FIGS. 6A-6B, a top view of the member 50 and a corresponding cross-sectional view of the gear shifter indicator assembly 24, respectively, is illustrated. The position indicator 156 is positioned above a plurality of light-producing assemblies 60 and below the indicia 54. Also, the position indicator 156 is attached to the shifter lever 28 such that the two components move in concert. The position indicator 156 includes a photoluminescent structure 10 therein and/or thereon that is configured to luminesce in response to excitation by the inputted light 100 emitted from the plurality of light-producing assemblies 60. Due to the close proximity of the position indicator 156 to the indicia 54, the indicia 54 may be backlit by the converted light 102 emitted from the photoluminescent structure 10. As the position indictor may be disposed under a single indicia 54 at a time, the backlit indicia 54 will notify an occupant of the vehicle 26 of the positional status of the shifter lever 28, and hence, the current mode of operation of the vehicle transmission 30. It should be appreciated, however, that the position indictor may be directly attached to the shifter lever 28, attached through the usage of additional components to the shifter lever 28, or otherwise move in concert with the shifter lever 28 depending on the gear shifter indicator assembly 24 utilized in a vehicle package without departing from the concepts provided herein.

As illustrated, five light-producing assemblies 60 are disposed longitudinally adjacent to one another and below each indicia 54 marking provided on the member 50. Each light-producing assembly 60 may independently illuminate when the position indicator 156 is positioned there above. Alternatively, all light-producing assemblies 60 may be illuminated contemporaneously while power is supplied to the lighting source by the vehicle power source.

According to one embodiment, an additional photoluminescent structure 158 is disposed on and/or used to form the indicia 54. In such as configuration, the light-producing assemblies 60 may be simultaneously illuminated and configured to output light at a first wavelength. The position indicator 156 has a first photoluminescent structure 10 therein and/or thereon that is configured to output light at a second wavelength in response to receiving the inputted light 100 from the light-producing assembly 60. Concurrently, the additional photoluminescent structure 158 may be configured to illuminate at a third wavelength. Thus, the position indictor may emit a first color from behind the indicia 54 while the indicia 54 may be emitting a second color. The first and second colors may be visually distinguishable from one another. In such a configuration, the current mode of the transmission 30 may illuminate in a color that is a combination of the first and second colors while the modes not currently in use may illuminate in only the second color.

Figure 7A:
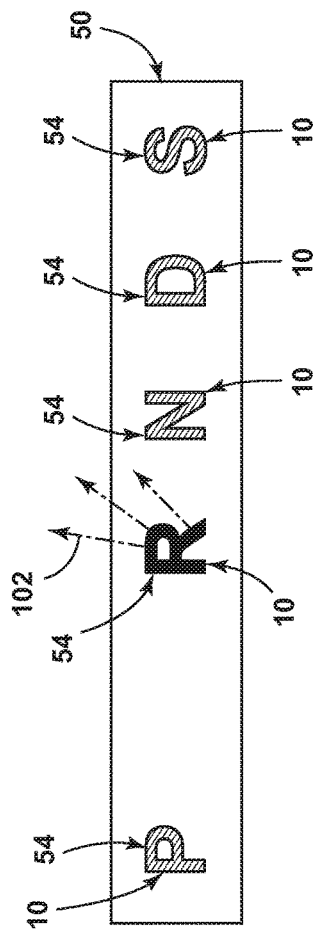
FIG. 7A is a top view of a member illustrating the lighting system and indicia thereon for notifying an occupant of the current mode of a vehicle transmission, according to one embodiment.
Figure 7B:
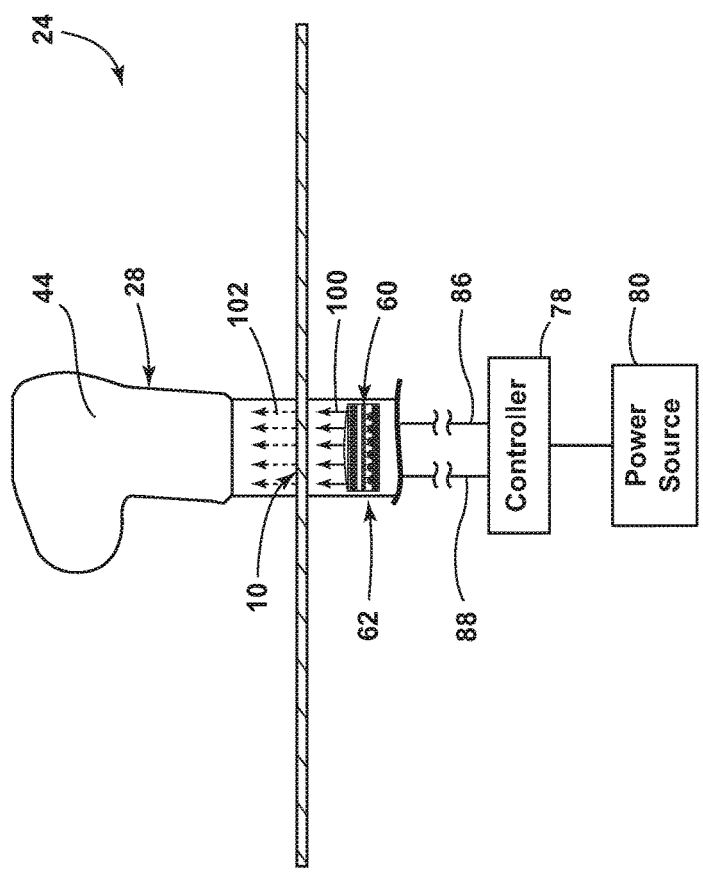
FIG. 7B is a cross-sectional view taken along line VII-VII of FIG. 2 illustrating the lighting system with the gear shifter lever attached to a position indicator having a light source thereon.

Referring to FIGS. 7A-7B, a top view of the member 50 and a corresponding cross-sectional view of the gear shifter indicator assembly 24, respectively, according to an alternative embodiment, is illustrated. As shown, the photoluminescent structure 10 is disposed on or integrally formed with the indicia 54. A light-producing assembly 60 is disposed on and/or forms the position indicator 156 that moves simultaneously with the shifter lever 28. In such a configuration, the light-producing assembly 60 emits light at a first wavelength towards the member 50 disposed proximately there above. The photoluminescent structure 10 is configured to emit light at a second wavelength in response to receiving light at the first wavelength.

As illustrated, the light-producing assembly 60 is sized such that it may only be disposed underneath one indicia 54 at a time. Additional components may be added to the end portions of the light-producing assembly 60 to further prevent light emitted therefrom from exciting nearby photoluminescent structures. Further, the electrical connectors in such a configuration may be disposed through the shifter lever 28 so as to not interfere with any additional components of the shift assembly.

Figure 8:
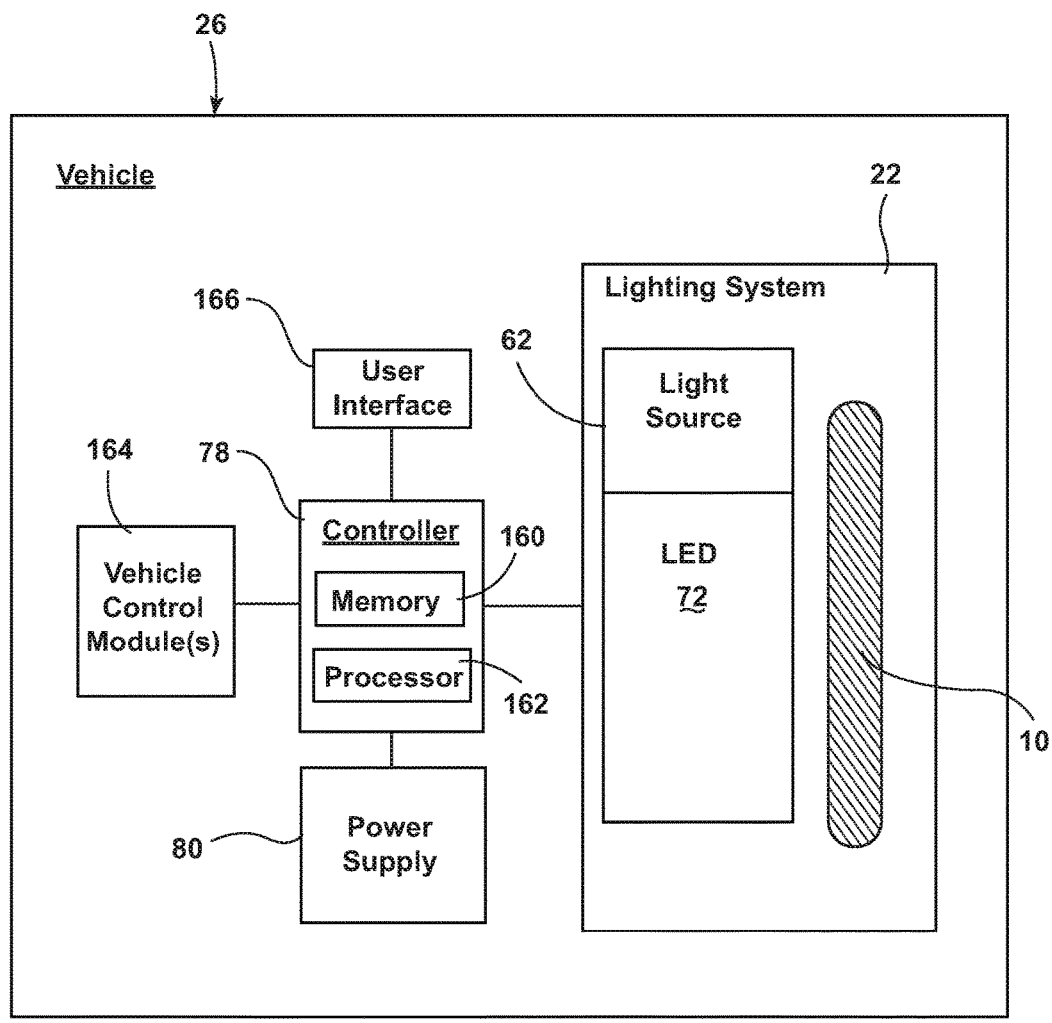
FIG. 8 is a block diagram of the vehicle and the lighting system.

Referring to FIG. 8, a block diagram of a vehicle 26 is shown in which the lighting system 22 is implemented. The lighting system 22 includes a controller 78 in communication with the light-producing assembly 60. The controller 78 may include memory 160 having instructions contained therein that are executed by a processor 162 of the controller 78. The controller 78 may provide electrical power to the light source 62, or to a respective bus bar 82, 84, via a power source 80 located onboard the vehicle 26. In addition, the controller 78 may be configured to control the light output of each light source 62 based on feedback received from one or more vehicle control modules 164 such as, but not limited to, a body control module, engine control module, steering control module, brake control module, the like, and/or a combination thereof. By controlling the light output of the light source 62, the lighting system 22 may illuminate in a variety of colors and/or patterns to provide an aesthetic appearance, or may provide vehicle information to an intended observer. For example, when a vehicle engine is in the on position, the light-producing assembly 60 may illuminate indicia 54 and/or the position indicator 156 within the vehicle 26.

In operation, each photoluminescent structure 10 may exhibit a constant unicolor or multicolor illumination. For example, the controller 78 may prompt the light source 62 to emit only the first wavelength of light via an LED to cause a photoluminescent structure 10 to illuminate in the first color (e.g., white). Alternatively, the controller 78 may prompt the light source 62 to emit only the second wavelength of light via the LED to cause the photoluminescent structures to illuminate in the second color (e.g., red). Alternatively still, the controller 78 may prompt the light source 62 to simultaneously emit the first and second wavelengths of light to cause the photoluminescent structures to illuminate in a third color (e.g. pinkish) defined by an additive light mixture of the first and second colors. Moreover, additional photoluminescent structures 158 may be added to the lighting system 22 that convert the light emitted from the light source 62 to a different wavelength. Alternatively still, the controller 78 may prompt the light source 62 to alternate between periodically emitting the first and second wavelengths of light to cause the photoluminescent structure 10 to periodically illuminate by alternating between the first and second colors. The controller 78 may prompt the light source 62 to periodically emit the first and/or second wavelengths of light at a regular time interval and/or an irregular time interval.

In another embodiment, the lighting system 22 may include a user interface 166. The user interface 166 may be configured such that a user may control the wavelength of light that is emitted by the LEDs and/or the LEDs that are illuminated. Such a configuration may allow a user to control which features are illuminated to assist in placing the vehicle transmission 30 in a desired mode. The user interface 166 may be disposed within the vehicle cabin or on any surface that is accessible to the user during utilization of the lighting system 22 described herein. The user interface 166 may use any type of control known in the art for control the light source 62, such as, but not limited to, proximity sensors.

With respect to the above examples, the controller 78 may modify the intensity of the emitted first and second wavelengths of light by pulse-width modulation or current control. In some embodiments, the controller 78 may be configured to adjust a color of the emitted light 100 by sending control signals to adjust an intensity or energy output level of the light source 62. For example, if the light source 62 is configured to output the first emission at a low level, substantially all of the inputted light 100 may be converted to the outputted, visible light. If the light source 62 is configured to emit inputted light 100 at a high level, only a portion of the inputted light 100 may be converted to the outputted light by the photoluminescent structure 10. In this configuration, a color of light corresponding to mixture of the inputted light 100 and the outputted light may be output as the emitted light. In this way, each of the controllers 78 may control an output color of the emitted light.

Though a low level and a high level of intensity are discussed in reference to the inputted light 100, it shall be understood that the intensity of the inputted light 100 may be varied among a variety of intensity levels to adjust a hue of the color corresponding to the emitted light 100, 102 from the lighting system 22. As described herein, the color of the outputted light may be significantly dependent on the particular photoluminescent material 96 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the light source 62, the concentration and proportions of the photoluminescent materials 96 in the photoluminescent structure 10 and the types of photoluminescent materials utilized in the photoluminescent structure 10 discussed herein may be operable to generate a range of color hues of emitted light by blending the inputted light 100 with the outputted light 102. It is also contemplated that the intensity of each light source 62 may be varied simultaneously, or independently, from any number of other light sources 62.

Accordingly, a lighting system implemented as a gear shifter indicator assembly for a vehicle has been advantageously described herein. The lighting system may provide various benefits including a simple and cost-effective means to produce a variety of illumination features that may be used as a styling feature and/or to assist an occupant in the usage of the illuminated gear shifter indicator assembly 24.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A gear shifter indicator assembly, comprising:
   a plurality of indicia separated from a shifter lever;
   a position indicator configured to move in concert with the shifter lever;
   a light source disposed on the position indicator and below the plurality of indicia;
   a first photoluminescent structure proximate the indicia and configured to luminesce in response to excitation by the light source; and
   a user interface configured to control the light source.

2. The gear shifter indicator assembly of claim 1, wherein the light source comprises a plurality of printed LEDs.

3. The gear shifter indicator assembly of claim 2, wherein the first photoluminescent structure comprises at least one photoluminescent material configured to convert an inputted light received from the light source into a visible light.

4. The gear shifter indicator assembly of claim 3, wherein the inputted light comprises one of blue light, violet light, and UV light.

5. The gear shifter indicator assembly of claim 1, further comprising:
   a light blocking component disposed at opposing ends of the light source to selectively illuminate a single indicia at one time.

6. The gear shifter indicator assembly of claim 5, further comprising:
   a second photoluminescent structure disposed on the indicia configured to luminesce in response to excitation by the light source in a color different from the first photoluminescent structure.

7. A gear shifter indicator assembly for a vehicle, comprising:
   a member separated from a gear shifter lever and having a plurality of indicia thereon;
   a light source configured to move in concert with the gear shifter lever, wherein the light source cooperates with the indicia to provide a transmission mode;
   a luminescent structure excitable by the light source; and
   a user interface configured to control a wavelength of light emitted by the light source.

8. The gear shifter indicator assembly for a vehicle of claim 7, wherein light source is disposed on a position indicator and the position indicator is configured to move in concert with the gear shifter lever.

9. The gear shifter indicator assembly for a vehicle of claim 7, wherein the indicia is defined by the luminescent structure.

10. The gear shifter indicator assembly for a vehicle of claim 8, wherein the light source is disposed on a position indicator that is operably coupled with the gear shifter lever.

11. The gear shifter indicator assembly for a vehicle of claim 7, wherein the light source comprises a printed LED.

12. The gear shifter indicator assembly for a vehicle of claim 11, wherein the luminescent structure comprises at least one luminescent material configured to convert an inputted light received from at least a portion of the printed LED into a visible light.

13. A gear shifter indicator assembly, comprising:
   a member separated from a gear shifter lever and having one or more transmissive member portions therein;
   a position indicator and a light source each movable in concert with the gear shifter lever;
   a first photoluminescent structure disposed on the transmissive member portions, the first photoluminescent structure operably coupled with the light source; and
   a user interface configured to control a wavelength of light emitted by the light source.

14. The gear shifter indicator assembly of claim 13, wherein the light source comprises a plurality of printed LEDs.

15. The gear shifter indicator assembly of claim 14, wherein the first photoluminescent structure comprises at least one photoluminescent material configured to convert an inputted light received from the light source into a visible light.

16. The gear shifter indicator assembly of claim 13, wherein the transmissive member portions define indicia that correlates to a state of operation of a vehicle transmission.

17. The gear shifter indicator assembly of claim 15, wherein the light emitted from the light source comprises one of blue light, violet light, and UV light.

18. The gear shifter indicator assembly of claim 13, further comprising:
   a second photoluminescent structure disposed proximate the transmissive member portions configured to luminesce in response to excitation by the light source in a color different from that of the first photoluminescent structure.

19. The gear shifter indicator assembly of claim 18, wherein a current state of a vehicle transmission is illuminated in a third color defined by an additive light mixture of the first and second photoluminescent structures by indicia disposed proximate the transmissive portion.

* * * * *